J. HUME.
HOSE COUPLING.
APPLICATION FILED OCT. 31, 1911.

1,136,012.

Patented Apr. 20, 1915.

WITNESSES

INVENTOR
John Hume
by Wm. M. Cady
Att'y.

UNITED STATES PATENT OFFICE.

JOHN HUME, OF HOUSTON, TEXAS, ASSIGNOR TO THE WESTINGHOUSE AIR BRAKE COMPANY, OF PITTSBURGH, PENNSYLVANIA, A CORPORATION OF PENNSYLVANIA.

HOSE-COUPLING.

1,136,012.  Specification of Letters Patent.  Patented Apr. 20, 1915.

Application filed October 31, 1911. Serial No. 657,772.

*To all whom it may concern:*

Be it known that I, JOHN HUME, a citizen of the United States, residing at Houston, in the county of Harris and State of Texas, have invented new and useful Improvements in Hose-Couplings, of which the following is a specification.

This invention relates to coupling devices and more particularly to a coupling for train pipes as employed on railway trains for connecting up fluid conduits and the like.

More specially in connection with fluid pressure brake systems, it has been proposed to provide various devices for trapping foreign matter such as water and sediment out of the fluid passing through the train pipe so as to prevent such foreign matter getting into the brake controlling valve mechanism where the same might have an injurious effect upon the more or less delicate valves employed.

The principal object of my invention is to provide means in the coupling head of the train pipe coupling for collecting foreign matter out of the fluid flowing through the train pipe.

Figure 1:
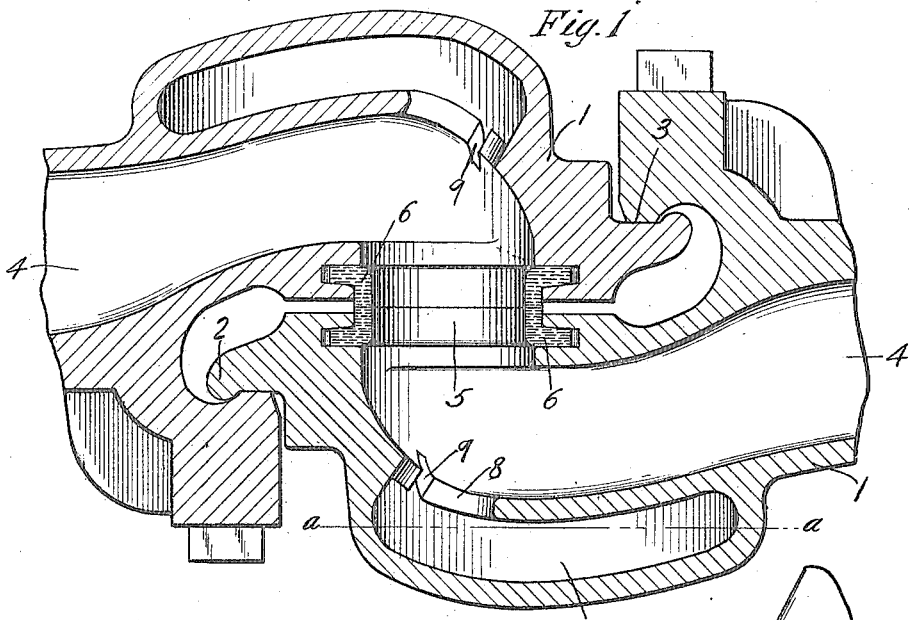
Figure 2:
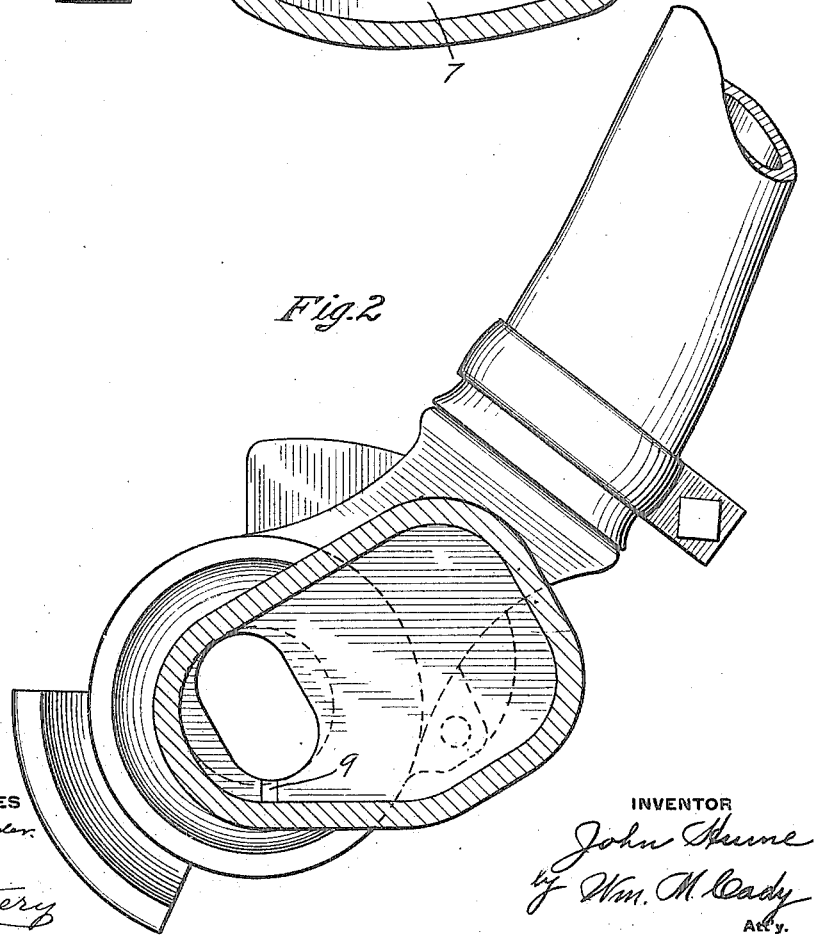

In the accompanying drawing, Figure 1 is a horizontal central sectional view of a train pipe coupling with my improvement applied thereto, and Fig. 2 an elevation view of a coupling head as it hangs when uncoupled, with the trap chamber sectioned on line *a—a* of Fig. 1.

My improvement is shown applied in the drawing to a coupling of the well known standard type having lateral openings adapted to communicate when two heads are coupled together, and in which the coupling head 1 is provided with the usual locking flanges 2 and 3 adapted upon rotary movement of the head to interlock with similar flanges on a counterpart head, and the fluid conduit 4 of which head communicates with a lateral port opening 5 containing the usual gasket 6.

According to my improvement, a chamber 7 is provided in the coupler head, having an opening 8 communicating with the fluid conduit 4.

It will now be seen that when fluid flows through the conduit 4, foreign matter such as water and sediment will collect in the chamber 7 and when the coupling is uncoupled and the coupling head hangs down such water and sediment will be drained out without any attention on the part of the operator. The opening 8 is preferably placed, as shown on the drawing, where the fluid takes a sharp turn in passing through the coupling and thus has a tendency to throw such foreign matter as may be contained in the fluid into the chamber 7.

In order to more completely drain the chamber 7, a passage-way 9 may be provided in such a position, as more clearly is shown in Fig. 2 of the drawing, that the lowest point of the chamber will be drained. The corners of the chamber are preferably rounded to prevent bursting of the coupling head in case of water freezing in the chamber.

It will now be clear that I have provided a very simple construction for the purpose indicated, requiring no additional attachments, and adapted to automatically dispose of the foreign matter collected without any attention on the part of the operator.

Even if the usual trap devices are employed, the present improvement will be of much service as it will prevent the ordinary collectors from filling as fast as they would otherwise fill, and consequently doing away with a proportionate amount of attention. At the same time, the coupling can be constructed practically at no additional expense over the usual coupling device.

Having now described my invention, what I claim as new and desire to secure by Letters Patent, is:—

1. In a coupling for train pipes, a coupling head having a fluid conduit and provided with a chamber having a restricted opening leading to said conduit for receiving water and sediment from fluid passing through the conduit, and a restricted passage for draining the chamber when the coupling head hangs uncoupled.

2. A coupling for train pipes comprising two heads having lateral communicating openings and means for locking said heads together to provide a conduit for fluid, each head having a side pocket opposite the lateral opening and opening only into said conduit for trapping foreign matter contained in fluid passing through the conduit, said chamber having its lowermost portion free to drain through the corresponding lateral opening when the coupling head hangs uncoupled.

3. A coupling for train pipes comprising two heads having lateral communicating openings and means for locking said heads together to provide a conduit for fluid, each head having a chamber opening into said conduit for trapping foreign matter contained in fluid passing through the conduit, and a restricted passage for draining the chamber through the lateral opening when a coupling head hangs uncoupled.

In testimony whereof I have hereunto set my hand.

JOHN HUME.

Witnesses:
 WM. A. CATHEY,
 MAY MONTGOMERY.

Copies of this patent may be obtained for five cents each, by addressing the "Commissioner of Patents, Washington, D. C."